United States Patent [19]

Friedwardt M. Winterberg

[11] 4,328,070

[45] May 4, 1982

[54] METHOD FOR THE INITIATION OF FUSION REACTIONS FOR THE CONTROLLED RELEASE OF ENERGY

[76] Inventor: Friedwardt M. Winterberg, P.O. Box 11661, Reno, Nev. 89510

[21] Appl. No.: 126,332

[22] Filed: Mar. 3, 1980

[51] Int. Cl.³ .............................................. G21B 1/00
[52] U.S. Cl. .................................................. 376/102
[58] Field of Search ........................................... 176/1

[56] References Cited

U.S. PATENT DOCUMENTS 4,272,320  6/1981  Lindl ....................................... 176/1

OTHER PUBLICATIONS

Z. Physik A–Atoms and Nuclei 296, 3–9 (1980) Winterberg Black Body Radiation Imploded Inside a Small Cavity as an Inertial Confinement Fusion Driver.
J. Phys. D:Appl. Phys., vol. 9, 1976, p. 105–108, Winterberg Ignition of Thermonuclear Microexplosions Inside a Egg-Shaped Cavity.

*Primary Examiner*—Sal Cangialosi

[57] ABSTRACT

The invention relates to a novel method for the controlled release of thermonuclear energy by inertial confinement. The essential feature of the invention is that is uses for the achievement of this goal high temperature black body radiation. The black body radiation is generated by hypervelocity impact onto a tenuous gas trapped inside a small cavity. The tenuous gas is shock-heated to high temperatures and thereby becomes a source of intense photon radiation, which after reaching thermodynamic equilibrium becomes a black body radiation. The thusly generated black body radiation is the furthermore amplified by adiabatic compression through the implosion of the cavity. During the implosion process the photons inside the cavity must be sufficiently well confined by the opacity of the cavity wall which sets a lower limit for the implosion velocity. The thusly created and amplified black body radiation is then used to ablatively implode and ignite a thermonuclear target placed inside the cavity. Because the attainable black body radiation temperatures typically reach values of $\approx 1$ keV, the corresponding short photon wave length should with much greater ease permit high density target compression than with other proposed drivers. The cavity implosion itself can be driven by any one of the available sources hitherto proposed for inertial confinement fusion, including laser beams, beams of charged particles and hypervelocity projectiles, but unlike in case of direct pellet fusion with a greatly reduced power and power density.

8 Claims, 2 Drawing Figures

METHOD FOR THE INITIATION OF FUSION REACTIONS FOR THE CONTROLLED RELEASE OF ENERGY

BACKGROUND OF THE INVENTION

There is a growing interest in drivers others than lasers to compress and ignite small quantities of thermonuclear fuel for the release of energy by inertial confinement. The reason for this search of alternative drivers are the inherent disadvantages of laser fusion. One of these disadvantages is the comparatively long wave length of laser light and which is not well matched to the plasma frequency at the desired high target densities which shall be reached by implosive compression. Lasers furthermore suffer from low efficiency and high cost. Finally, the problem of stimulated Brillouin backscattering from the target sets an upper limit for the laser power. Other driver options presently under study include beams of charged particles ranging from electrons to heavy ions and even projectiles accelerated to hypervelocities. However, the very large requirements in beam power combined with good beam focusing is likely to make any one of these alternative concepts also rather expensive.

In case the ignition is done with heavy ion beams generated by conventional particle accelerators, the length of these accelerators will be many km. The same is true for the concept of impact fusion by the magnetic acceleration of a small superconducting solenoid to hypervelocities.

The original proposals for several of these alternative driver concepts, for example the pulsed acceleration of an intense beam of ions by a magnetically insulated diode, were made by the inventor a long time ago.

SUMMARY OF THE INVENTION

In the proposed invention the high power required to drive an ablatively driven thermonuclear target is drown from intense black body radiation trapped and compressed inside a small cavity. The work to compress and hence amplify the black body radiation can be drawn from a variety of external sources, which may include lasers, charged particle beams, hypervelocity projectiles and even focused chemical explosion waves. When these energy sources are directly used to drive an inertial confinement fusion microexplosion, the required beam power and beam power density are much larger. In the invention proposed, the initial drive energy is converted into black body radiation by a shock wave. The thusly generated black body radiation is then intermediately stored inside a small cavity before being delivered to the thermonuclear target. This intermediate energy storage into black body radiation is the reason why the intial driver power is here much smaller than in case these drivers are directly used for thermonucler ignition. The basic concept of the idea is explained in FIG. 1 showing how the invention works for a beam induced ablatively driven implosion of a small cavity. In FIG. 2 an arrangement is shown how this can be done using a hypervelocity projectile. In the first case shown in FIG. 1 the cavity is spherical and in the second case shown in FIG. 2 conical. However, other cavity geometries are also possible. In any one of these geometries the thermonuclear target is placed inside the cavity. It is also possible to have a multistage assembly of concentric spherical shells imploding on each other and whereby the black body radiation generated in the space in between these shells ablatively implodes the next inner shell.

DETAILED DESCRIPTION OF THE INVENTION

Figure 1:
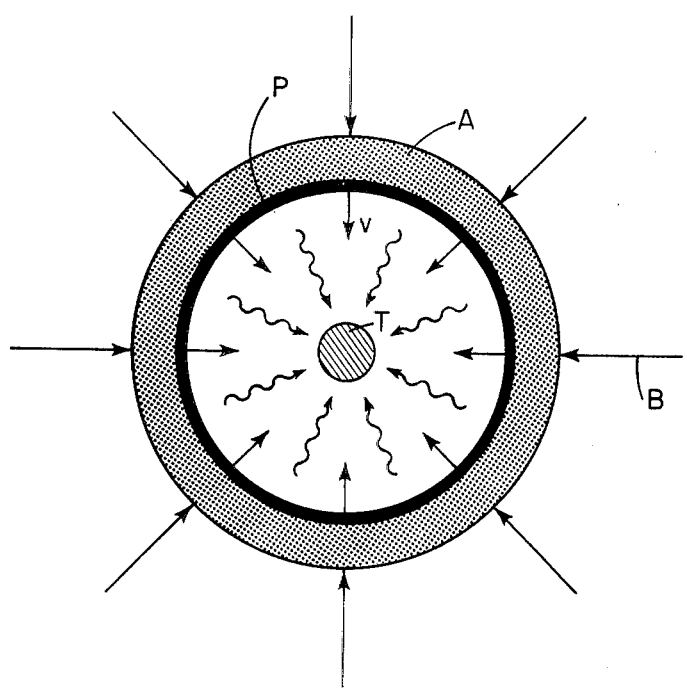
FIG. 1 shows a spherical cavity consisting of the ablator A and pusher P with beams B hitting the ablator from all sides. The cavity is filled with a tenuous high atomic weight gas producing upon impact by the imploding pusher black body radiation by shock heating, which is imploded with the velocity v and absorbed by the thermonuclear target T inside the cavity.

The invention proposed, in comparison to previously proposed inertial confinement fusion drivers, promises to reduce greatly the driver power, and also substantially to relax the focusing requirement. The concept is explained in FIG. 1. The thermonuclear pellet T is placed in the center of a spherical cavity with the initial radius $r=r_o$ and which is several times larger than the pellet radius $r_p$. The cavity is formed by a pusher P consisting of dense material, preferably uranium. Inside the cavity is a low density gas of a sufficiently high atomic weight, for example krypton. The pusher of the spherical cavity is surrounded by an ablator A. If beams B are projected onto the ablator A the pusher will be imploded with the velocity v. The fact that the outer ablator radius is larger than the pellet radius greatly relaxes the focusing requirements compared to direct pellet fusion. Because the beams are here only of modest power and because the outer ablator radius of the cavity is larger than the pellet radius the implosion velocity too will be here smaller than required for direct pellet fusion. The imploding pusher upon its impact on the krypton gas generates a shock wave, provided the gas density is sufficiently high to make the collision mean free path small compared to the cavity radius. Because of the many atomic transitions in the krypton gas and which are excited at the high temperature behind the shock front, the kinetic energy in the shock front will be rapidly converted into photons with the result that the cavity will be filled with black body radiation. If the density of the krypton gas is sufficiently low, but still sufficiently high to make a shock wave, one can ensure that the cavity itself is optically transparent. Then, if the implosion velocity of the cavity is sufficiently high the losses of radiation through the cavity wall can be made sufficiently low and the thusly formed black body radiation is highly compressed. The imploded black body radiation confined by the dense pusher wall will thereby expose the pellet surface to a power flux rising in proportion to $T^4$. Furthermore, since the opacity of the pellet surface rises in proportion to $T^{-3.5}$ the total power absorbed by it will rise in proportion to $T^{7.5}$. The temperature of the black body radiation, if perfectly confined by the walls of the cavity, rises insentropically according to $VT^3 =$ const., where V is the cavity volume. For $r_p < < r$ one has Tr $\simeq$ const. and the photon power flux transmitted to the pellet rises in proportion of $r^{-7.5}$.

By the absorption of the black body radiation in the pellet surface, the pellet is then itself ablatively imploded.

If the implosion velocity V is constant one has for the time dependence of the cavity radius $r = r_o(1-t/t_o)$, with $t_o = r_o/v$. Therefore, the total radiation power delivered to the pellet surface rises as $$P(t) = 4\pi r^2_p \sigma T_o^4 (1-t/t_o)^{-4} \tag{1}$$

where $\sigma = 5.75 \times 10^{-5}$ erg/cm$^2$sec °K.$^4$ is the Stefan-Boltzmann constant. The total power absorbed rises as $$P_a(t) \propto (1-t/t_o)^{-7.5} \tag{2}$$

It thus follows that the power absorbed is strongly peaked at the end of the implosion process near $t = t_o$. This simply means that during the implosion process the kinetic implosion energy of the pusher is first converted and intermediately stored in the form of black body radiation and only at the end of the implosion process delivered at high peak power to the pellet. This intermediate storage of the available energy into black body radiation makes it possible to work with a greatly reduced initial driver power. Furthermore, since unlike in laser fusion, the wave length is here much shorter and in the soft X-ray region, much larger pellet compression should be possible. The reason for this is that the plasma frequency of the target must be well matched to the frequency of the incoming radiation to assure good energy deposition in the target surface and hence high ablation implosion efficiencies.

The minimum required velocity for the cavity implosion can be estimated from the requirement that the power of the black body radiation shall be $\sim 10^{14}$ Watt onto a pellet surface of $\sim 10^{-1}$ cm$^2$. According to the Stefan-Boltzmann law this power is reached at a temperature of $T \simeq 3.6 \times 10^6$ °K. However, to store an energy of $\sim 10^7$ Joule in the form of black body radiation this would require a cavity volume of $V = 75$ cm$^3$. This rather large volume suggests to go to higher temperatures which not only reduces the required cavity volume but also increses the radiation power which is inversely proportional to it. As a reasonable compromise we choose the initial temperature to be $5 \times 10^6$ °K. which during the cavity implosion shall rise to $\sim 10^7$ °K., implying a reduction in the cavity radius by a factor two and representing a very modest implosion. At a temperature of $10^7$ °K. the final cavity volume is just 1.3 cm$^3$. The maximum total power incident at the pellet inside the cavity and reached at $T = 10^7$ °K. is then $5.75 \times 10^{15}$ Watt. The intitial and final cavity radius are here 1.4 cm and 0.7 cm. Since the ablator radius is of the same order, the beam focusing requirements can be easily met using light ion beams, one of the cheapest drivers.

If a solid wall, in our case the pusher wall, moves into a gas of atomic weight A a shock wave moves ahead of the wall with the temperature behind the shock front given by (1)

$$T = \frac{A}{3R(Z+1)} v^2, \tag{3}$$

where R is the gas constant, and Z the degree of ionization approximately given by $$Z \simeq 6.6 \times 10^{-3} T^{0.41}. \tag{4}$$

From (3) and (4) one can compute v to reach a desired value of T.

For $T = 5 \times 10^6$ °K. and $A = 200$ one finds $v = 46$ km/sec, and for krypton with $A = 83$, $v \simeq 71$ km/sec. In the considered temperature range the collision cross section is $\sim 10^{-16}$ cm$^2$. This requires to make the atomic number density of the shock heated gas not less than $\sim 10^{18}$ cm$^{-3}$.

To make the gas optically transparent the photon path length $\lambda_p = (\rho \eta)^{-1}$ ($\rho$ gas density) has to be larger than the cavity radius $r \sim 1$ cm. The opacity coefficient $\eta$ is here given by (2)

$$\kappa = 4.34 \times 10^{25} \rho T^{-3.5} \frac{g}{t}, \tag{5}$$

where $g \simeq 1$ is the Gaunt and t the guillotine factor. In stellar atmospheres one puts $t \simeq 10$ but because of the great level density in high atomic weight material one may probably put $t \simeq 1$. It thus follows that at $T \simeq 10^7$ °K. and for $\rho \lesssim 0.3$ g/cm$^3$, corresponding to an atomic number density of $\lesssim 10^{31}$ cm$^{-3}$, the optical path length is larger than $\sim 1$ cm. Therefore, at an atomic number density of $\sim 10^{18}$ cm$^{-3}$, as required for shock heating, the gas is optically transparent. To make the gas pressure smaller than the radiation pressure requires to put the atomic number density less than $10^{21}$ cm$^{-3}$. Therefore, after the gas, having an atomic number density of $\sim 10^{18}$ cm$^{-3}$, has been shock heated the work done by the pusher is primarily against the radiation pressure.

Of crucial importance for the feasibility of the concept is the confinement of the black body radiation in the imploding cavity. The velocity by which the radiation can escape through the cavity wall is given by the radiative heat flux ($a = 4\sigma/c$)

$$j = \frac{\lambda_p c}{3} \frac{\delta}{\delta x} (aT^4), \tag{6}$$

where $\lambda_p = (\eta \rho)^{-1}$ is the photon path length in the dense pusher wall. Putting $j = aT^4 v_d$, where $v_d$ is the photon diffusion velocity and $\partial(aT^4)/\partial x \sim aT^4/x$, where x is the distance travelled by the diffusion wave, one finds $$v_d/c \simeq (\tfrac{1}{3}) (\lambda_p/x). \tag{7}$$

For $T \simeq 10^7$ °K. and $\rho = 18$ g/cm$^3$ one has according to (5) $\lambda_p = (\rho \eta)^{-1} \simeq 2 \times 10^{-4}$ cm. Putting $x \lesssim 1$ cm, setting an upper value for the photon permitted to diffuse out of the cavity, one finds that $v_d \gtrsim 20$ km/sec. Therefore, if $v > v_d$, the photon gas in the cavity will be compressed. More detailed calculations show, that at an implosion velocity of $\gtrsim 50$ km/sec the photon losses through the pusher wall are not very significant.

The high final temperature of $\sim 10^7$ °K. implies that the typical radiation frequency, given by $h\nu \sim kT$ and which is in the soft X-ray domain, is matched to a plasma frequency of $\sim 10^4$ times compressed hydrogen. The proposed target bombardment by black body radiation is therefore much better suited to reach high target densities than the much longer wave lengths of laser beams. Furthermore, unlike laser beams, no stimulated Brillouin back-scattering occurs and the radiation reflected from the target surface is here not lost since all the radiation is trapped inside the cavity.

Figure 2:
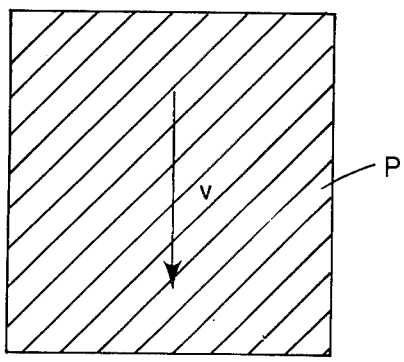
FIG. 2 shows the realization of the same idea and which is the principal novelty of the invention, in case the cavity implosion is caused by a hypervelocity projectile. Here P is the hypervelocity projectile moving towards the conical cavity with the velocity v. The cavity, conical in shape, is carved out of the anvil AN and is filled with a tenuous gas G. The cavity wall is coated with a sufficiently thick layer U of dense high opacity material to confine the photons during the cavity implosion.
Figure 2:
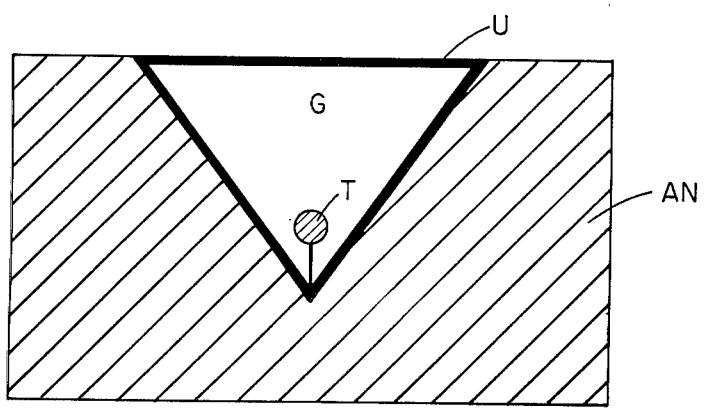

The required low implosion velocity of ~50 km/sec makes the proposed concept also an interesting candidate for impact fusion since those velocities should be attainable with relative ease by magnetic propulsion techniques. How this could be incorporated into an impact fusion target is shown in FIG. 2, where an incoming hypervelocity projectile generates and compresses black body radiation inside a conical cavity. If light ion beams are used to implode the cavity, the reduction in the implosion velocity from ~200 km/sec down to ~50 km/sec reduces the required beam power down to $1.5 \times 10^{12}$ Watt. Light ion beams at these power levels and at the relaxed focusing requirement down to $\gtrsim 1$ cm$^2$ can be already produced and therefore make them an especially promising candidate for the realization of the proposed invention.

REFERENCES (1) L. D. Landau and E. M. Lifshitz, Fluid Mechanics, Pergamon Press, London 1959, pp. 331, 358.

(2) M. Schwarzschild, Structure and Evolution of Stars, Princeton University Press, 1958, p. 67 ff.

I claim:

1. A method for the achievement of fusion energy release by inertial confinement comprising:
   (a) positioning a target within a cavity filled with a tenuous gas, the atomic weight A of the gas being given by $$T = \frac{A}{3R(Z + 1)} V^2$$

where R is the gas constant, Z is the degree of ionization given by $Z = 6.6 \times 10^{-3} T^{0.41}$, T varies from $5 \times 10^6$ °K. to $10^7$ °K., V varies from 20 km/sec to 200 km/sec;
   (b) using at least one power source to implode said cavity, the implosion being selected from the group consisting of ablatively driven implosion or direct high velocity impact implosion, said tenuous gas, having an initial atomic number density of between $10^{18}$ cm$^{-3}$ and $10^{21}$ cm$^{-3}$, becoming a source of black body radiation upon the high implosion velocity (V);
   (c) confining, compressing and thereby amplifying the black body radiation;
   (d) ablatively imploding the target positioned inside said cavity by means of black body radiation absorbed on the surface of said target.

2. The application of the method according to claim 1 for the generation of useful power by letting a sequence of fusion microexplosions take place inside a reactor chamber.

3. The application of the method according to claim 1 for the propulsion of spacecraft by letting a sequence of fusion microexplosions take place behind a structure being selected from the group consisting of either a pusher plate or concave reflector.

4. The application of the method according to claim 1 where said target includes a small amount of fissile material is compressed with the goal of controlled release of fission energy in small bursts.

5. The application of the method according to claim 1 where the target is composed of both fissile and fusionable material and together being ablatively compressed by the black body radiation for enhanced fission and fusion yield of the ensuing microexplosions.

6. The application of the method according to claim 1 where the source to implode the cavity is selected from the group consisting of either intense laser or charged particle beams.

7. The application of the method according to claim 1 where the initial energy source to implode the cavity is drawn from a macroscopic projectile accelerated to high velocities.

8. The application of the method according to claim 1 where the energy source to implode the cavity is obtained from focused chemical explosion waves.

* * * * *